US010235359B2

(12) United States Patent
Tremblay et al.

(10) Patent No.: US 10,235,359 B2
(45) Date of Patent: Mar. 19, 2019

(54) ONTOLOGY AND ANNOTATION DRIVEN GRAMMAR INFERENCE

(71) Applicant: Nuance Communications, Inc., Burlington, MA (US)

(72) Inventors: Réal Tremblay, Outremont (CA); Jerome Tremblay, Montréal (CA); Stephen Douglas Peters, Pointe-Claire (CA); Serge Robillard, Lachine (CA)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 13/941,783

(22) Filed: Jul. 15, 2013

(65) Prior Publication Data

US 2015/0019202 A1  Jan. 15, 2015

(51) Int. Cl.
  *G06F 17/27* (2006.01)
(52) U.S. Cl.
  CPC .............................. *G06F 17/2785* (2013.01)
(58) Field of Classification Search
  USPC ...................................................... 704/9, 10
  See application file for complete search history.

(56) References Cited

U.S. PATENT DOCUMENTS

| 5,878,385 | A | 3/1999 | Bralich et al. | |
|---|---|---|---|---|
| 6,615,178 | B1 * | 9/2003 | Tajima | 704/277 |
| 7,257,565 | B2 | 8/2007 | Brill | |
| 7,548,847 | B2 * | 6/2009 | Acero et al. | 704/9 |
| 7,617,093 | B2 * | 11/2009 | Ramsey | 704/10 |
| 7,653,545 | B1 * | 1/2010 | Starkie | G10L 15/22 704/257 |
| 7,869,998 | B1 | 1/2011 | Di Fabbrizio et al. | |
| 8,972,445 | B2 * | 3/2015 | Gorman | G06F 17/2785 707/771 |
| 9,767,093 | B2 | 9/2017 | Tremblay et al. | |
| 2002/0111811 | A1 * | 8/2002 | Bares et al. | 704/275 |
| 2002/0133347 | A1 | 9/2002 | Schoneburg | |
| 2002/0156616 | A1 * | 10/2002 | Russell | 704/4 |
| 2003/0121026 | A1 * | 6/2003 | Wang et al. | 717/124 |
| 2004/0083092 | A1 * | 4/2004 | Valles | 704/9 |
| 2004/0122653 | A1 * | 6/2004 | Mau et al. | 704/2 |
| 2004/0220797 | A1 * | 11/2004 | Wang et al. | 704/9 |

(Continued)

FOREIGN PATENT DOCUMENTS

WO  WO 2015/195744 A1  12/2015

OTHER PUBLICATIONS

Notification of Transmittal of the International Search Report and the Written Opinion of the International Searching Authority for Int'l Application No. PCT/US2015/036143, "Syntactic Parser Assisted Semantic Rule Inference by Generation of Alternate Parse Trees," dated Nov. 26, 2015.

(Continued)

*Primary Examiner* — Michael N Opsasnick
(74) *Attorney, Agent, or Firm* — Hamilton, Brook, Smith & Reynolds, P.C.

(57) ABSTRACT

Inferring a natural language grammar is based on providing natural language understanding (NLU) data with concept annotations according to an application ontology characterizing a relationship structure between application-related concepts for a given NLU application. An application grammar is then inferred from the concept annotations and the application ontology.

20 Claims, 6 Drawing Sheets

(56) References Cited

U.S. PATENT DOCUMENTS

| | | | |
|---|---|---|---|
| 2004/0220809 A1* | 11/2004 | Wang et al. | 704/257 |
| 2004/0243568 A1* | 12/2004 | Wang | G06F 17/3043 |
| 2005/0246158 A1 | 11/2005 | Weise | |
| 2006/0074634 A1* | 4/2006 | Gao | G06F 17/271 704/9 |
| 2006/0212841 A1 | 9/2006 | Sinai et al. | |
| 2008/0059149 A1* | 3/2008 | Martin | G06F 17/2785 704/9 |
| 2008/0126078 A1* | 5/2008 | Starkie | G06F 17/274 704/9 |
| 2008/0133220 A1* | 6/2008 | Paek et al. | 704/9 |
| 2008/0208584 A1 | 8/2008 | Ativanichayaphong et al. | |
| 2009/0076799 A1* | 3/2009 | Crouch et al. | 704/9 |
| 2009/0259459 A1 | 10/2009 | Ceusters et al. | |
| 2009/0276396 A1* | 11/2009 | Gorman | G06F 17/2785 |
| 2009/0292530 A1* | 11/2009 | Jarmulak et al. | 704/10 |
| 2010/0145902 A1* | 6/2010 | Boyan et al. | 706/54 |
| 2010/0161316 A1* | 6/2010 | Haug | G06F 17/2715 704/9 |
| 2010/0332217 A1 | 12/2010 | Wintner et al. | |
| 2011/0054899 A1 | 3/2011 | Phillips et al. | |
| 2012/0109637 A1* | 5/2012 | Merugu | G06F 17/30864 704/9 |
| 2013/0173247 A1 | 7/2013 | Hodson | |
| 2014/0040312 A1* | 2/2014 | Gorman | G06F 17/2785 707/771 |
| 2014/0297282 A1 | 10/2014 | Peters et al. | |
| 2014/0337814 A1* | 11/2014 | Kalns | G06F 8/00 717/100 |
| 2015/0186504 A1* | 7/2015 | Gorman | G06F 17/2705 707/752 |
| 2015/0370778 A1 | 12/2015 | Tremblay et al. | |
| 2016/0026608 A1 | 1/2016 | Curin et al. | |

OTHER PUBLICATIONS

Gonçalves, Patricia Nunes, et al., "Treebanking by Sentence and Tree Transformation: Building a Treebank to Support Question Answering in Portuguese," LREC 2012, Turkey, May 23, 2012, pp. 1895-1901.

Burkett, David et al., "Transforming Trees to Improve Syntactic Convergence," Proceedings of the 2012 Joint Conference on Empirical Methods in Natural Language Processing and Computational Natural Language Learning, Jul. 12, 2012, pp. 863-872, Retrieved from the Internet URL: http://www.cccs.berkeley.edu/~dburkett/papers/burkett12/tree_transform.pdf [retrieved on Nov. 19, 2015].

Torisawa, Kentaro, "A Nearly Unsupervised Learning Method for Automatic Paraphrasing of Japanese Noun Phrases," in Proceedings of the Sixth Natural Language Processing Pacific Rim 2001, Jan. 1, 2001.

Bengoetxea, Kepa, et al., "Exploring Treebank Transformation in Dependency Parsing," International Conference Ranlp 2009, Jan. 1, 2009, pp. 33-38, Borovets, Bulgaria.

Cheongjae Lee, Sangkeun Jung, Seokhwan Kim, Gary Geunbae Lee, "Example-based dialog modeling for practical multi-domain dialog system," copyright 2009, published by ScienceDirect, Speech Communication 51 (2009), pp. 466-484.

Notification Concerning Transmittal of International Preliminary Report on Patentability for Int'l Application No. PCT/US2015/036143; "Syntactic Parser Assisted Semantic Rule Inference by Generation of Alternate Parse Trees," dated Dec. 20, 2016.

Kluwer, T., et al., "Using Syntactic and Semantic based Relations for Dialogue Act Recognition," Coling 2010: Poster Volume, pp. 570-578, Beijing, Aug. 2010.

* cited by examiner

Fig. 1

--PRIOR ART--

ONTOLOGY AND ANNOTATION DRIVEN GRAMMAR INFERENCE

TECHNICAL FIELD

The present invention relates to natural language understanding (NLU), and in particular, to automatic generation of NLU grammars from application ontologies.

BACKGROUND ART

Natural Language Processing (NLP) and Natural Language Understanding (NLU) involve using computer processing to extract meaningful information from natural language inputs such as human generated speech and text. One recent application of such technology is processing speech and/or text queries in mobile devices such as smartphones.

Figure 1:
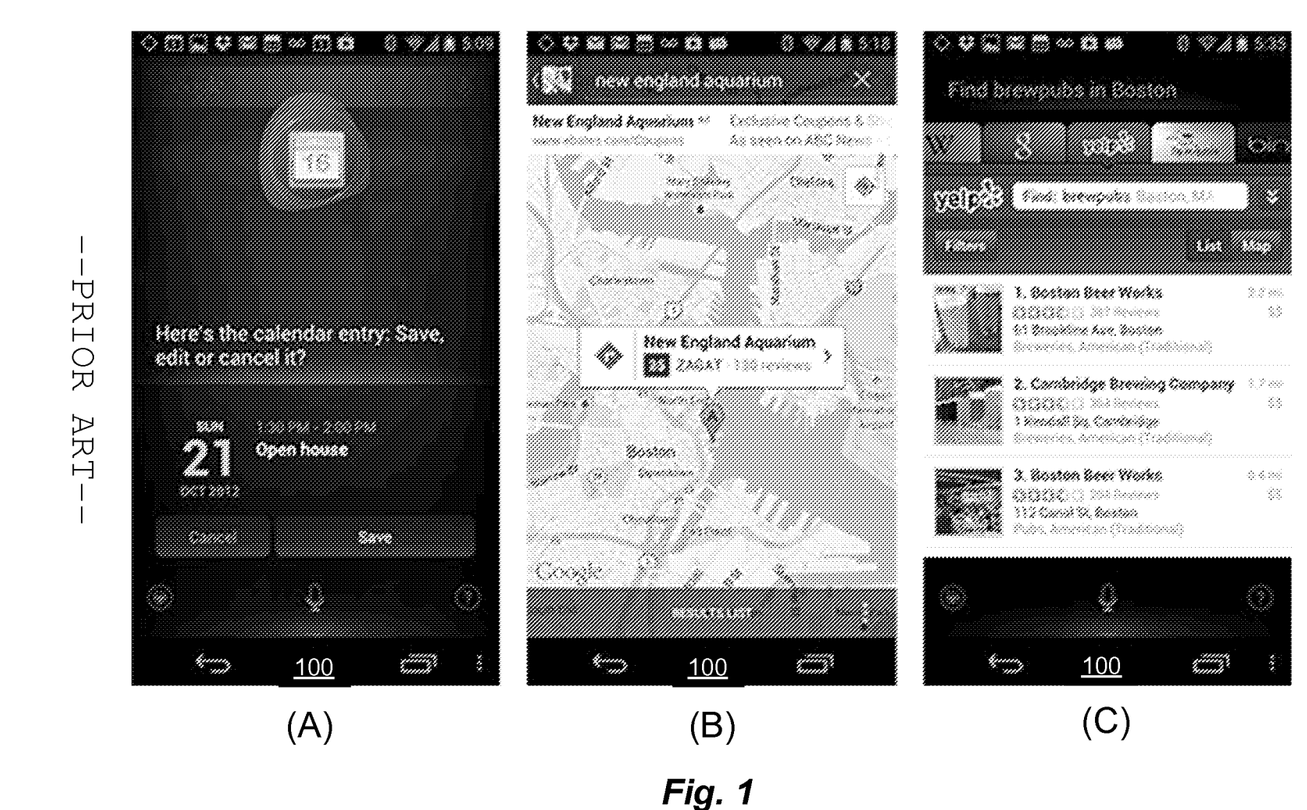
FIG. 1A-C shows examples screens from an NLU application for a mobile device.

U.S. Patent Publication 20110054899 describes a hybrid client-server NLU arrangement for a mobile device. Various example screen shots of the application interface 100 from one such mobile device NLU application, Dragon Mobile Assistant for Android, are shown in FIGS. 1A-C. Dragon Mobile Assistant processes speech query inputs and obtains simultaneous search results from a variety of top websites and content sources. Such applications require adding an NLU component to an existing web search algorithm and an automatic speech recognition (ASR) arrangement in order to extracting semantic meaning from the input queries.

An NLU application based on ASR utilizes a statistical language model to initially recognize the words or likely words that were uttered based on probabilities such as the probability that an utterance is a given word based on one or more previously recognized words. Some language models are topic domain-specific such as medical radiology or aircraft control. A language model is often built by analyzing a large set of representative sentences, phrases or the like, to obtain statistics about word occurrence frequency, which words tend to occur after other words or phrases, etc.

The recognition grammars acts to interpret the semantic meanings of the recognized words. In this context, a recognition grammar is a set of phrases that a system is prepared to recognize. Conceptually, the phrases in a grammar represent all legitimate utterances a user may make. If a user utterance is included in the grammar, the system recognizes words of the utterance. If the user utters something that is not in the grammar, the utterance may be considered ungrammatical ("out-of-grammar"), and the system may not recognize the utterance correctly.

However, typically there are many ways a human can express a particular idea or command. For example, a user may order "two large pizzas, one with olives and the other with anchovies," or the user may say she wants "one olive pizza and one anchovy pizza, both large." Both utterances have the same meaning. Thus, a grammar writer's task involves predicting a set of phrases and encoding the phrases in the grammar. However, due to the variety of ways ideas and commands can be expressed, a grammar that accommodates a reasonable range of expressions can be quite large and difficult to design. Furthermore, the complexity of a grammar greatly affects speed and accuracy of an ASR system. Thus, complex grammars should be constructed with as much care as complex software programs. Grammar writing, however, is an unfamiliar task for most software developers, and creating a high-quality, error-free grammar requires somewhat different skills than programming in a language, such as Java or C++. For example, grammars are inherently non-procedural. Thus, many typical software development approaches are not applicable to grammar development.

In a speech-enabled NLU application, recognition slots are sometimes used to hold individual pieces of information from a recognized utterance. For example, in an automated banking system, slots may be defined for: (1) command-type (examples of which may include deposit, withdrawal, bill-payment and the like); (2) source-account (checking, savings or money-market); and (3) amount. An NLU application fills these slots with logical representations of recognized words and then passes the slots to application code for processing. For example, the phrases "the first of March" and "March the first" may cause a slot labeled date to be filled with "Mar01" or some other unambiguous date representation.

Developing NLU grammars is a time-consuming expensive process that requires considerable time and effort from human experts using large databases.

SUMMARY

Embodiments of the present invention are directed to inferring a natural language grammar based on providing natural language understanding (NLU) data with concept annotations according to an application ontology characterizing a relationship structure between application-related concepts for a given NLU application. An application grammar is then inferred from the concept annotations and the application ontology.

The concept annotations may then be revised based on parsing the NLU data and the concept annotations with the application grammar. New NLU data can be parsed with the application grammar to develop concept annotations for the new NLU data; for example, using a structure tree of the concept annotations reflecting the application ontology. Inferring an application grammar may include inferring a back-off grammar from the annotations. Inferring an application grammar also may include incorporating one or more existing grammars for one or more of the application-related concepts. The inferred application grammar can be employed in an initial semantic interpreter for an NLU arrangement. The inferred grammar rules can be used to parse an input query to extract features for semantic processing by a statistical learning machine arrangement.

Embodiments of the present invention also include a computer program product in a non-tangible computer readable storage medium for execution on at least one processor of a method of inferring a natural language grammar, wherein the computer program product has instructions for execution on the at least one processor comprising program code for performing the method according to any of the above.

DETAILED DESCRIPTION

Embodiments of the present invention are based on developing NLU grammars for a new application or new vertical domain from an application/domain ontology and a hierarchy of concept annotations. Existing grammars for common concepts are reused instead of relying on costly experts and time-consuming wholly manual process. An annotation user provides concept annotations from high-level concept (e.g., intentions) down to low-level concepts based on the concept relationships described by the ontology. That then allows grammar rules to be directly inferred.

Figure 2:
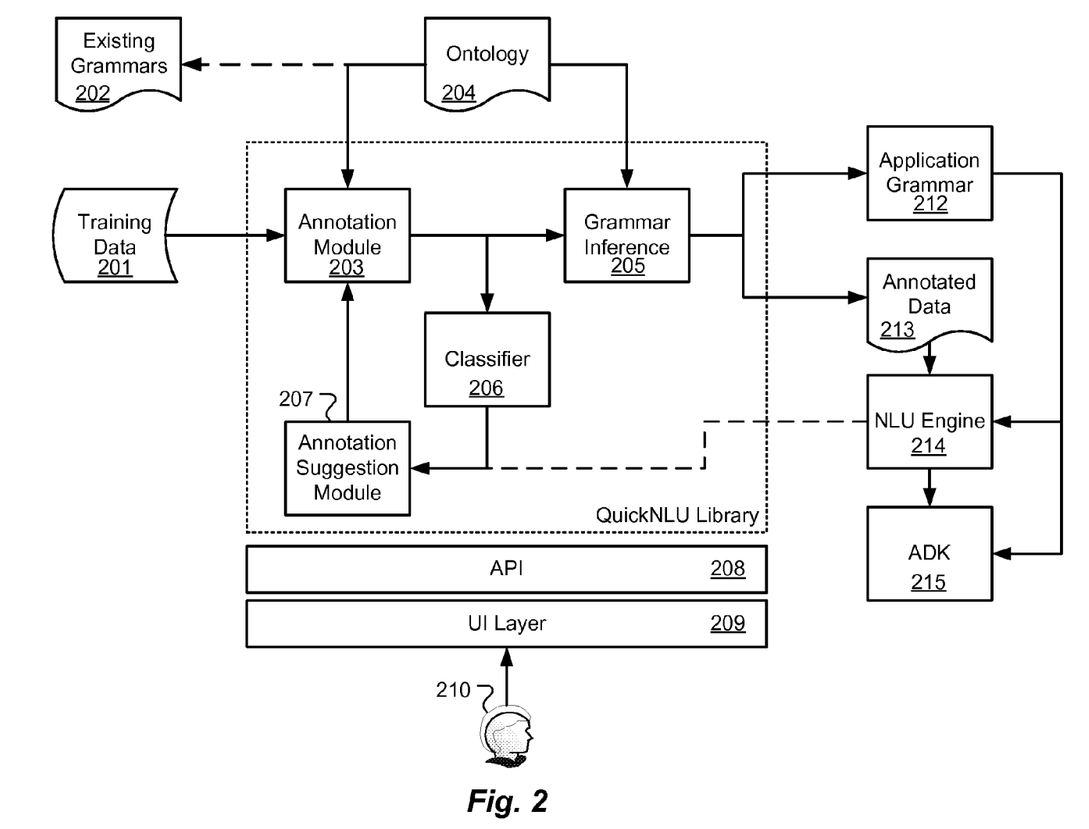
FIG. 2 shows various functional blocks and relationships in an NLU system for inferring grammars according to an embodiment of the present invention.
Figure 3:
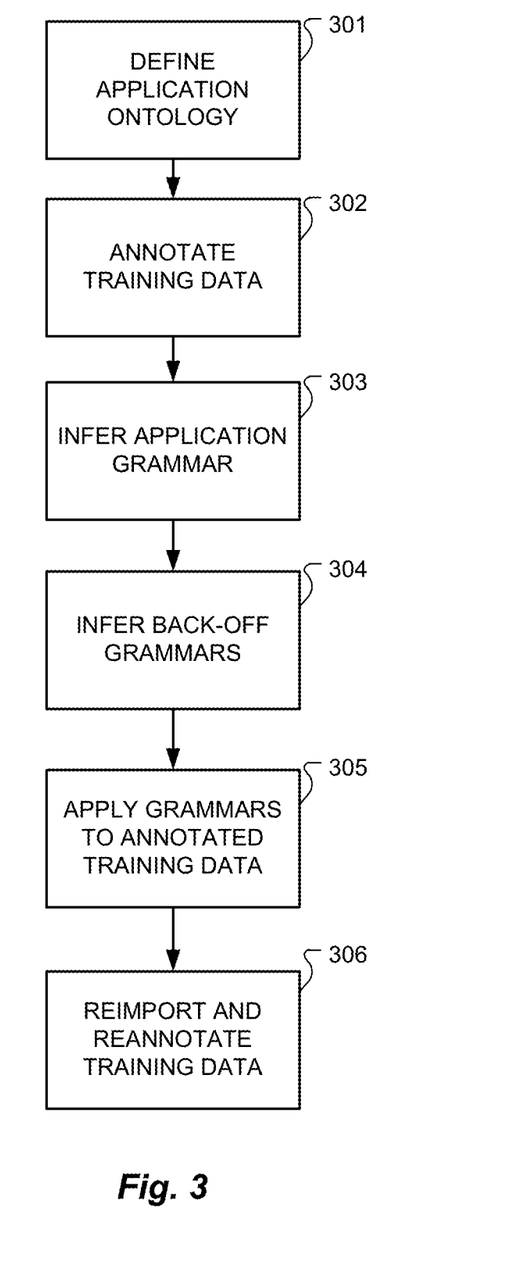
FIG. 3 shows various logical steps in developing an inferred grammar according to an embodiment of the present invention.

FIG. 2 shows various functional blocks and relationships in an NLU system for inferring grammars, and FIG. 3 shows various logical steps in developing an inferred grammar. First, a new application ontology 204 is defined, step 301 that describes the various concepts that need to be extracted by the NLU system and a hierarchy of their relationships. This is described at some length in U.S. patent application Ser. No. 13/852,165, filed Mar. 28, 2013, which is incorporated herein by reference.

Figure 4:
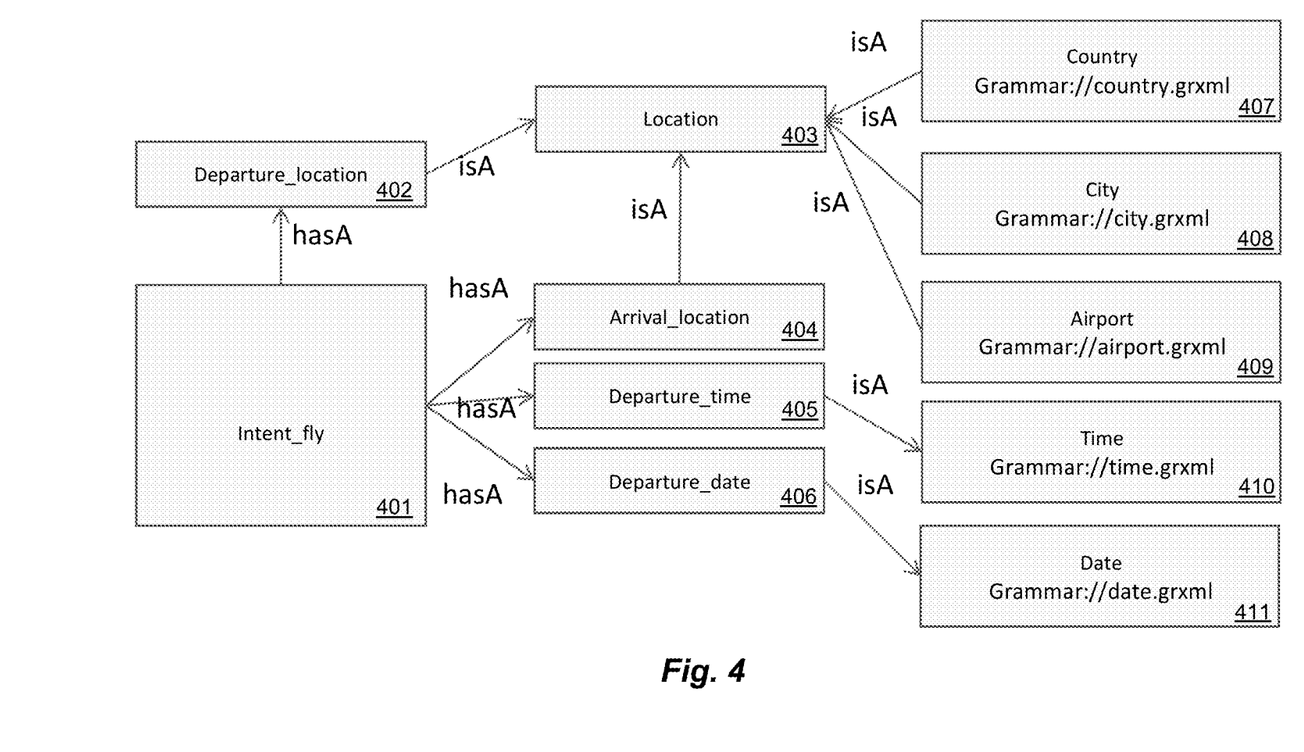
FIG. 4 shows an example of an ontology for airline travel.

For example, FIG. 4 shows an ontology 204 for an airline ticket reservation application based on relationships such as isA and hasA and universal common concepts with existing grammars (e.g. list of cities). The design of such a new NLU application uses an itemization of possible "intentions," including, for example, the "user intent to travel," intent_fly 401. Such an "intention" comes with a number of possible sub-pieces of information such as departure_location 402, departure_date 406, departure_time 405, and arrival location 404. These mid-level intentions in turn are related in the ontology 204 to more basic low-level concepts. Both departure_location 402 and arrival_location 404 derive from the lower mid-level concept location 403, which in turn can be represented by low-level concepts such as city 408, country 407 and/or airport 409, each of which can point to an already existing grammar 202. Similarly, mid-level concepts departure_time 405 and departure_date 406 derive from low-concepts time 410 and date 411 that have existing grammars 202. Those grammars can come from heavily-tuned phase structure grammars (e.g., for date and time) or from database look-up (e.g., for cities).

Low-level concepts such as location, date, time, etc. are common to many pre-existing applications and can be present in a common ontology with corresponding grammar links. An annotation user 210 then only needs to add new domain-specific concepts to the ontology 204. In the example shown in FIG. 4, the annotation user 210 will only have to declare the new concept intent_fly 401.

Once the ontology 204 has been defined, step 301, an annotation user 210 uses an annotation module 203 to annotate input training data 201 for the new application, step 302. The user 210 tags each available sentence in the training data 201 with the appropriate multi-level concept annotations from the defined ontology 202. The first level is the intent, if there is one is present. Then in lower concept levels come the specific parts of the intent that are linked to low-level concepts.

For example, the sentence I would like to fly from Montreal to New-York next Monday would be tagged as:

First level:  <intent_fly> I would like to fly from Montreal to New-York next Monday </intent_fly>
Second level:  <intent_fly> I would like to fly from <departure_location> Montreal </departure_location> to <arrival_location> New-York </arrival_location> <departure_date> next Monday </departure_date> </intent_fly>
Third level:  <intent_ fly> I would like to fly from <departure_location> <location> Montreal </location> </departure_location> to <arrival_location> <location> New-York </location> </arrival_location> <departure_date> <date> next Monday </date> </departure_date></intent_fly>
Fourth level:  <intent_fly> I would like to fly from <departure_location> <location><city> Montreal</city> </location> </departure_location> to <arrival_location> <location> <city> New-York </city> </location> </arrival_location> <departure_date> <date> <order>next </order> <day_of_week> Monday </day_of_week> </date> </departure_date> </intent_fly>

Figure 5:
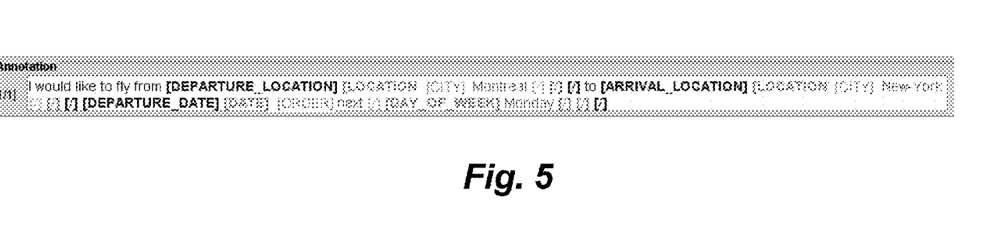
FIG. 5 shows an example of annotated data.
Figure 6:
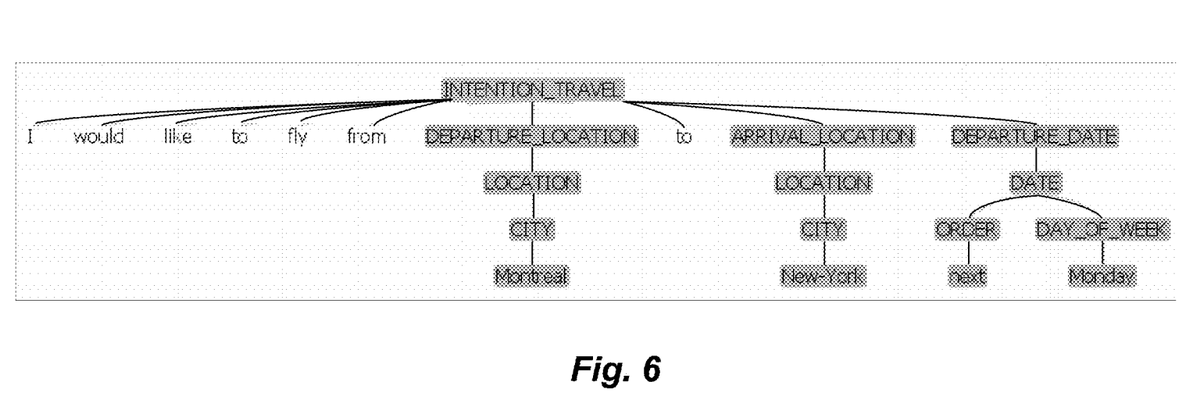
FIG. 6 shows an example of a tree structure display for hierarchical annotation of data.

FIG. 5 shows an example of how that final level of annotation might be presented via API 208 and UI Layer 209 to the user 210. It may be useful for an annotation classifier 206 to provide the annotation user with accurate annotation suggestions 207 at all levels. For example, FIG. 6 shows a tree-like annotation structure that just specifies the information added at each level so that the display is much less complicated than the string shown in FIG. 5.

Given multiple levels of annotation from defining the application ontology, step 301, and annotating the training data 201 via annotation module 203, step 302, a grammar inference module 205 can infer grammar rules for an NLU grammar 212 for the new application, step 303. Once there is multi-level annotation data 213, the grammar inference module 205 can create a grammar rule that refers to lower-level concept grammars and promotes those to the correct higher-level concepts. This can be done for each level of the annotation hierarchy. The new application grammar 212 is not inferred directly using the ontology 204, but rather indirectly because the annotation module 203 is driven by the ontology 204 and the annotation user 210 can only select concepts that are linked in the ontology 204. During the annotation module 203, the UI Layer 209 may only let the annotation user 210 select concepts that are linked together in the ontology 204.

The previous example sentence, I would like to fly from Montreal to New-York leaving next Monday, provides the inference of the grammar path:

```
<item>
    I would like to fly from
        <ruleref uri="#LOCATION"/> <tag>departure_location=
        LOCATION.location</tag>
    to
        <ruleref uri="#LOCATION"/> <tag>arrival_location=
        LOCATION.location</tag>
    leaving
        <ruleref uri="#DATE"/> <tag>departure_date= DATE .date</tag>
        <tag> intent = "intent_fly"</tag>
</item>
``` where the grammar rule LOCATION includes a grammar of city names:

```
    <rule id="LOCATION" scope="private">
        <one-of>
```

```
    <item> <ruleref uri="City.grxml "/>
        <tag>location=City.city</tag>
        </item>
    </one-of>
</rule>
```

The grammar rule DATE includes absolute and relative date-defining phrases. Note that the grammar rules inferred from the first two levels represent full sentence covering rules in the new application grammar 212. Those full sentence rules come directly from the annotated data 213.

Another example sentence might be: When does flight one two three arrive. The annotation would be:

```
<request_arrival_time> When does flight
<flight_number> <cardinal_number> one two three
</cardinal_number> </flight_number> arrive
</request_arrival_time>
```

And the resulting full inferred sentence rule is:

```
<item>
    When does flight
    <ruleref uri="CARDINAL_NUMBER"/>
        <tag>flight_number = CARDINAL_NUMBER.number </tag>
    arrive
        <tag>itent = "request_arrival_time"</tag>
</item>
```

In the first inferred grammar example above, the words Montreal, New York, next, and Monday are handled by the respective low level concepts cities, cities, order and day_of_week. And so it is enough for the grammar inference module 205 to just infer grammar rules that promote those low-level concepts, and there is no need to create new rules that catch words and set values (like a rule that returns city:montreal for the word Montreal). But some concept words may not be covered by the low-level concepts rules. Take for example the sentence:
I would like to fly from Montreal to the Big Apple next Monday.
The annotation user 210 would tag this sentence as before except that when tagging "the Big Apple" as a city, the grammar inference module 205 knows that city is a terminal low-level concept in the ontology 204 with an existing grammar 202. And the grammar inference module 205 will also know that "the Big Apple" is not covered by the city grammar, and will ask the annotation user 210 for a value for the slot return by that grammar. In this example, the annotation user 210 might respond by entering the value "New York" and then the grammar would be modified to now cover the Big Apple.

The inferred new application grammar 212 as initially created covers full sentences. For robust NLU operation, the grammar inference module 205 also creates smaller back-off grammar rules, step 304. By using the top-level annotation of all the verified sentences in the annotated data 213, the grammar inference module 205 can extract part of an annotation that appears in the same context. For example:
I want to fly from DEPARTURE_LOCATION to ARRIVAL_LOCATION.
I would like to go from DEPARTURE_LOCATION to ARRIVAL_LOCATION.
I'm leaving from DEPARTURE_LOCATION going to ARRIVAL_LOCATION next month.
In these examples, the grammar inference module 205 extracts "from DEPATURE_LOCATION" and "to ARRIVAL_LOCATION" as unambiguous rules that are added as back-off rules to the inferred application grammar 212. In general, these are derived from contextual existing grammars 202 labeled above as:
"<intention>_<X>_DEPARTURE LOCATION" and
"<intention>_<X>_ARRIVAL LOCATION".

Output slot format. The inferred grammar needs to generate an output that will be understood by the component using the NLU engine 214. That can be done using a meaning representation in JSON format as the output of the inferred grammar based on the annotation and the ontology. This meaning representation is the information extracted by the NLU engine 214 that will be sent to the next component, for example, Application Developer Kit (ADK) 215.

Suppose the intention intent_travel is associated with the following sentence:

```
I would like to fly from <departure_location> <location> <city>
Montreal</city> </location> </departure_location> to
<arrival_location> <location> <city> New-York </city> </location>
</arrival_location>.
```

The NLU engine 214 parses the sentence: "I would like to fly from montreal to new york," with the application grammar 212 and the output JSON format will be:

```
{"INTENT_TRAVEL" : {
"DEPARTURE_LOCATION" : { "LOCATION" : {"CITY" :
"montreal" } } },
"ARRIVAL_LOCATION":{ "LOCATION" : {"CITY" : "new york" } }
}
```

The application grammar 212 can also be applied to the annotated data 213, step 305, to evaluate the consistency of the annotation module 203. Sentences in the annotated data 213 which are covered by the application grammar 212 parse fully. This can be done regularly in the user annotation session and permits significant annotation time savings since as the annotation user 210 progresses, more and more sentences in the annotated data 213 are already covered by the development of the application grammar 212 coming from previous annotations. The annotation user 210 also can reimport and re-annotate data that is not yet covered by the inferred application grammar 212, step 306, and this can be iteratively repeated as many times as needed.

Figure 7:
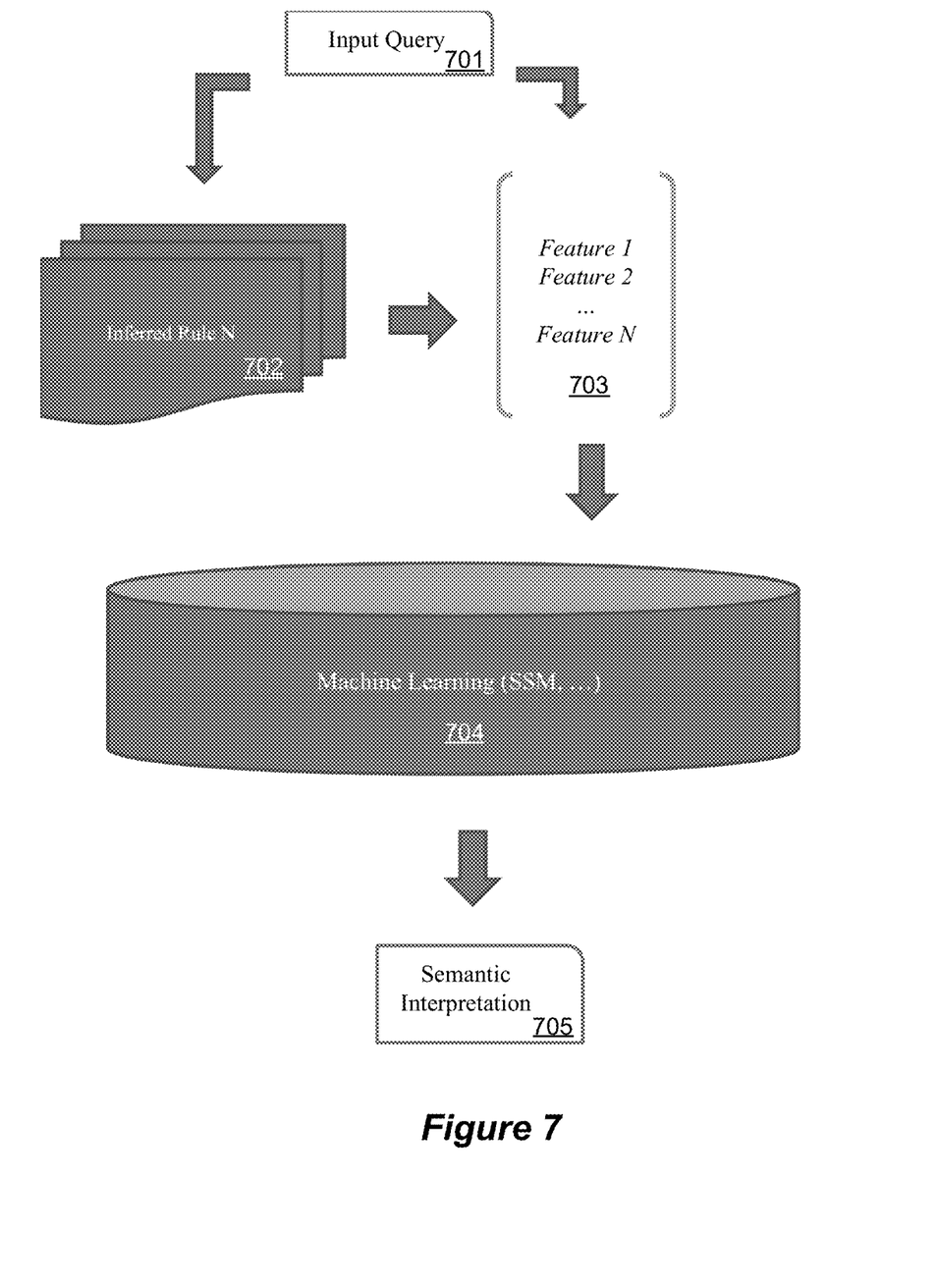
FIG. 7 shows an example of a statistical learning machine arrangement using inferred grammar rule output to add to the input feature set of the machine.

Such inferred grammars can be used in a front-end initial semantic interpreter for an NLU arrangement such as statistical semantic model (SSM) system. A user input query can be parsed by the inferred grammars to develop a semantic interpretation 705. If the grammar parsing of the input query is unsuccessful (no meaning returned), then the query can be passed to a statistical learning machine for an interpretation. For example, FIG. 7 shows an arrangement where the user input query 701 is parsed by the inferred grammar rules 702 to extract additional query features 703 (e.g., one feature for each firing rule) which are added to any existing query features 703 for further downstream processing by the statistical learning machine arrangement 704. Such a statistical learning machine arrangement 704, may be, for example, a statistical semantic model (SSM) arrangement such as the Nuance SSM or any similar learning machine.

Embodiments of the invention may be implemented in whole or in part in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A computer-implemented method of automatically inferring a natural language grammar for use in a statistical semantic model (SSM) system, the method comprising, by a processor and associated memory:
   providing, in storage memory communicatively coupled to the processor, natural language understanding (NLU) data with multi-level concept annotations according to an application ontology characterizing a relationship structure between application-related concepts for a given NLU application, a plurality of the application-related concepts being domain-specific concepts;
   relating, in the storage memory, mid-level concepts in the application ontology to two or more respective lower-level concepts, wherein each mid-level concept is derived from the two or more respective lower-level concepts and each lower-level concept has a respective associated existing grammar;
   automatically inferring a new application grammar from the multi-level concept annotations and the application ontology, including inferring, directly from the multi-level concept annotations and indirectly from the application ontology, a grammar rule from each level of a multi-level annotation hierarchy;
   a given grammar rule of the inferred grammar rules promoting at least one lower-level concept grammar rule to at least one higher-level concept grammar rule, the promoting resulting from the relating, in the storage memory, of a given mid-level concept to the two or more respective lower-level concepts, wherein each lower-level concept has a respective associated existing grammar;
   in response to the promoting, accessing the storage memory to automatically reuse a given rule from the existing grammars associated with the two or more respective lower-level concepts related to the given mid-level concept to infer the new application grammar with respect to the at least one higher-level concept; and
   employing the new application grammar, through access of the storage memory, in a semantic interpreter of a SSM system to determine a semantic interpretation of a user query.

2. The computer-implemented method according to claim 1, wherein inferring an application grammar includes inferring a back-off grammar from the annotations.

3. The computer-implemented method according to claim 1, wherein inferring an application grammar includes incorporating one or more existing grammars for one or more of the application-related concepts.

4. The computer-implemented method according to claim 1, further comprising:
   revising the concept annotations based on automatically parsing the NLU data and the concept annotations with the application grammar.

5. The computer-implemented method according to claim 1, further comprising:
   automatically parsing new NLU data with the application grammar to develop concept annotations for the new NLU data.

6. The computer-implemented method according to claim 5, wherein a structure tree of the concept annotations reflecting the application ontology is used for automatically parsing the new NLU data.

7. The computer-implemented method according to claim 1, wherein the semantic interpreter is an initial semantic interpreter for an NLU arrangement.

8. The computer-implemented method according to claim 1, further comprising:
   automatically parsing an input query with a grammar rule from the inferred grammar to extract features for semantic processing by a statistical learning machine arrangement.

9. A computer program product for automatically inferring a natural language grammar for use in a statistical semantic model (SSM) system, the computer program product comprising a non-transitory computer readable storage medium having instructions thereon for execution on at least one processor to:
   provide, in storage memory communicatively coupled to the at least one processor, natural language understanding (NLU) data with multi-level concept annotations according to an application ontology characterizing a relationship structure between application-related concepts for a given NLU application, a plurality of the application-related concepts being domain-specific concepts;

relate, in the storage memory, mid-level concepts in the application ontology to two or more respective lower-level concepts, wherein each mid-level concept is derived from the two or more respective lower-level concepts and each lower-level concept has a respective associated existing grammar;

automatically infer a new application grammar from the multi-level concept annotations and the application ontology, including inferring, directly from the multi-level concept annotations and indirectly from the application ontology, a grammar rule from each level of a multi-level annotation hierarchy;

cause a given grammar rule of the inferred grammar rules to promote at least one lower-level concept grammar rule to at least one higher-level concept grammar rule, the promoting resulting from the relating, in the storage memory, of a given mid-level concept to the two or more respective lower-level concepts, wherein each lower-level concept has a respective associated existing grammar;

in response to the promoting, access the storage memory to automatically reuse a given rule from the existing grammars associated with the two or more respective lower-level concepts related to the given mid-level concept to infer the new application grammar with respect to the at least one higher-level concept; and employ the new application grammar, through access of the storage memory, in a semantic interpreter of a SSM system to determine a semantic interpretation of a user query.

10. The computer program product according to claim 9, wherein inferring an application grammar includes inferring a back-off grammar from the annotations.

11. The computer program product according to claim 9, wherein inferring an application grammar includes incorporating one or more existing grammars for one or more of the application-related concepts.

12. The computer program product according to claim 9, further comprising instructions to:
revise the concept annotations based on automatically parsing the NLU data and the concept annotations with the application grammar.

13. The computer program product according to claim 9, further comprising instructions to:
automatically parse new NLU data with the application grammar to develop concept annotations for the new NLU data.

14. The computer program product according to claim 13, wherein a structure tree of the concept annotations reflecting the application ontology is used for automatically parsing the new NLU data.

15. The computer program product according to claim 9, wherein the semantic interpreter is an initial semantic interpreter for an NLU arrangement.

16. The computer program product according to claim 9, further comprising instructions to:
automatically parse an input query with a grammar rule from the inferred grammar to extract features for semantic processing by a statistical learning machine arrangement.

17. The computer-implemented method according to claim 1, wherein the application grammar is inferred based upon the concept annotations being driven by the application ontology.

18. The computer-implemented method according to claim 1, further comprising selecting, by an annotation user, one or more of the concept annotations, the one or more of the concept annotations being linked in the application ontology.

19. The computer-implemented method according to claim 1, further comprising inferring the new application grammar including automatically resolving ambiguities in the new application grammar.

20. A computer-implemented system for automatically inferring a natural language grammar for use in a statistical semantic model (SSM) system, the computer-implemented system comprising:
at least one processor; and
at least one memory with computer code instructions stored thereon, the at least one processor and the at least one memory, with the computer code instructions, configured to cause the system to implement:
an annotation module configured to:
provide, in storage memory communicatively coupled to the at least one processor, natural language understanding (NLU) data with multi-level concept annotations according to an application ontology characterizing a relationship structure between application-related concepts for a given NLU application, a plurality of the application-related concepts being domain-specific concepts;
relate, in the storage memory, mid-level concepts in the application ontology to two or more respective lower-level concepts, wherein each mid-level concept is derived from the two or more respective lower-level concepts and each lower-level concept has a respective associated existing grammar;
an inference module configured to:
automatically infer a new application grammar from the multi-level concept annotations and the application ontology, including inferring, directly from the multi-level concept annotations and indirectly from the application ontology, a grammar rule from each level of a multi-level annotation hierarchy;
cause a given grammar rule of the inferred grammar rules to promote at least one lower-level concept grammar rule to at least one higher-level concept grammar rule, the promoting resulting from the relating, in the storage memory, of a given mid-level concept to the two or more respective lower-level concepts, wherein each lower-level concept has a respective associated existing grammar; and
in response to the promoting, access the storage memory to automatically reuse a given rule from the existing grammars associated with the two or more respective lower-level concepts related to the given mid-level concept to infer the new application grammar with respect to the at least one higher-level concept; and
the at least one processor further configured to provide the new application grammar to a SSM system, the new application grammar being employed in a semantic interpreter of the SSM system to determine a semantic interpretation of a user query.

* * * * *